US007788650B2

(12) United States Patent
Johnson et al.

(10) Patent No.: US 7,788,650 B2
(45) Date of Patent: Aug. 31, 2010

(54) COMPILER-BASED CRITICAL SECTION AMENDMENT FOR A MULTIPROCESSOR ENVIRONMENT

(75) Inventors: Erik J. Johnson, Portland, OR (US); Stephen D. Goglin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1513 days.

(21) Appl. No.: 11/126,570

(22) Filed: May 10, 2005

(65) Prior Publication Data

US 2007/0006186 A1    Jan. 4, 2007

(51) Int. Cl.
*G06F 9/45* (2006.01)
(52) U.S. Cl. .................. 717/140; 717/141; 717/149; 717/151; 717/153
(58) Field of Classification Search .................. 717/149, 717/153, 159
See application file for complete search history.

(56) References Cited

U.S. PATENT DOCUMENTS

| | | | | |
|---|---|---|---|---|
| 5,678,026 A | * | 10/1997 | Vartti et al. ................ | 711/152 |
| 5,822,588 A | * | 10/1998 | Sterling et al. ............. | 717/131 |
| 6,144,983 A | * | 11/2000 | Klots et al. ................. | 718/104 |
| 6,237,043 B1 | * | 5/2001 | Brown et al. ............... | 719/316 |
| 6,708,330 B1 | * | 3/2004 | Moberg et al. ............. | 717/158 |
| 6,735,760 B1 | * | 5/2004 | Dice ........................... | 717/139 |
| 6,789,253 B1 | * | 9/2004 | Streich et al. .............. | 717/138 |
| 7,089,540 B2 | * | 8/2006 | Ogasawara ................. | 717/140 |
| 2003/0028755 A1 | * | 2/2003 | Ohsawa et al. ............. | 712/216 |
| 2004/0250240 A1 | * | 12/2004 | Stoodley et al. ............ | 717/116 |

OTHER PUBLICATIONS

Satoh et al., Compiler Optimization Techniques Compiler Optimization Techniques for OpenMP Programs, 2000.*
Bova et al., "Parallel Programming with Message Passing and Directives," IEEE, Sep. 2001.*
Min et al., "Portable Compilers for OpenMP," Springer-Verlag, 2001.*
Tseng, "Compiler optimizations for eliminating barrier synchronization," ACM, 1995.*
Ravi Rajwar et al., "Speculative Lock Elision: Enabling Highly Concurrent Multithreaded Execution", *Proceedings of the 34th International Symposium on Microarchitecture (MICRO)*, Dec. 3-5, 2001, 12 pages, Austin, Texas.

* cited by examiner

*Primary Examiner*—Insun Kang
(74) *Attorney, Agent, or Firm*—Grossman, Tucker, Perreault & Pfleger, PLLC (57) ABSTRACT

Source code includes a directive to indicate data structures of related data to a compiler. The compiler associates the related data to the same one of multiple processors in a multiprocessor environment. The compiler searches the source code for locks associated with the related data, and generates executable code that is modified with respect to locks written in the source code. The compiler may replace or remove locks written in the source code to protect access to the related data, resulting in an executable program that does not include the locks.

20 Claims, 4 Drawing Sheets

COMPILER-BASED CRITICAL SECTION AMENDMENT FOR A MULTIPROCESSOR ENVIRONMENT

FIELD

Embodiments of the invention relate to computer software development, and more particularly to compiler changes to critical sections when compiling code for a multiprocessor environment.

BACKGROUND

In cache-coherent multiprocessor systems, the hardware maintains data cache coherency to preserve the validity of data. The data cache coherency is performed via a coherency protocol, which may include snooping or directory-based techniques. One cache coherency protocol is the MESI (Modified, Exclusive, Shared, Invalid—referring to states of a cache line) protocol. Cache coherency may include writing data changes to multiple caches, and may include mechanisms to prevent access to the same resource (e.g., a particular variable, a database value) by multiple processors, or simultaneous modification of data by multiple processors. Mechanisms to avoid collision of access to a resource/data by multiple processors can be referred to generically as synchronization constructs (also referred to as critical sections, locks, semaphores, etc.), which operate to dedicate a particular resource to one processor and exclude other processors from access while it is locked.

Specific lock avoidance techniques have been developed for multiprocessor networking environments. In general, data cache locality/affinity improves cache performance because fewer cache misses result when a processor's operations focus on data already stored in the cache. To attempt to enhance data cache affinity, some multiprocessor networking systems are programmed to associate a single traffic flow with a single processor. Techniques such as receive side scaling (also sometimes referred to as flow pinning) attempt to keep all traffic associated with a flow at the same processor and associated cache for improved cache data reuse. Another technique developed is speculative lock avoidance (also called speculative lock elision), which involves runtime coordination (e.g., hardware and software operating together) to provide faster execution of some routines. The speculative lock elision technique involves speculatively assuming at run-time that parallel operations by multiple processors will succeed without locks, temporarily ignoring the locks and performing the operations, and then recovering from misprediction by undoing changes made with the misprediction.

The techniques described above are implemented in source code that will operate on the processors. Source code is typically generated to implement one or more technique described above. To generate executable code (often referred to as binary code) from source code, a compiler is used, which essentially translates source code, or code from a higher-level language (e.g., C, C++, JAVA™, etc.), into a lower-level format (e.g., machine code). Compilers are often designed to check for code patterns, and a "smart" compiler can provide succinct code (often referred to colloquially as "optimized" code) by recognizing source code patterns/constructs. Compilers often allow for special directives (e.g., many C compilers recognize the "#pragma" directive) to be inserted into the source code, which may provide information/processing instructions to the compiler to indicate how code should be interpreted/compiled. Typically a compiler ignores a directive that it does not recognize/understand. Each of the above techniques use source code that a compiler will compile into executable code. The result of the techniques is a combination of software and hardware working together to avoid some critical sections, but that still include unnecessary cache coherency overhead when distributing related operations in a multiprocessor environment.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Descriptions of certain details and implementations follow. Reference may be made herein to an "embodiment," which may be understood as describing a particular feature, structure, or characteristic included in at least one embodiment of the invention. Thus, the appearance of phrases such as "in one embodiment," or "in an alternate embodiment" may describe various embodiments and implementations of the invention, and may not necessarily all refer to the same embodiment.

With knowledge of a system and a domain, a programmer may be able to generate code optimized to a specific application. More common, however, is that a programmer desires to have portable code, and so will produce source code that could be applied to multiple different systems/domains, including ones for which certain efficiency techniques may not be appropriate, or may not perform correctly. For example, in a multiprocessor environment (e.g., simultaneous multiprocessor (SMP), on-chip multiprocessor (CMP), etc.), it may be more efficient from the perspective of executing an application for related data to be pinned or localized to the same processor. However, some systems may not support this feature, and/or some compilers may not support such a feature. Thus, in such circumstances, synchronization constructs or critical sections may be included in source code for dealing with related data, even though the overhead associated with the synchronization constructs reduces performance efficiency. As used herein, synchronization construct refers generically to any one of a number of mechanisms/concepts, including critical sections, semaphores, locks, etc. For purposes of simplicity in description, the expression "locks" will be used herein to refer to any type of synchronization construct. Thus, reference to locks should not be construed as limiting to any particular mechanism, but could mean any of a number of mechanisms.

In one embodiment a mechanism is employed to identify related data that could be pinned to a single one of multiple processors in a system. The identified related data could be processed in parallel among multiple processors without the need for locks and/or cache coherency if the compiler generates executable code to dedicate all processing of the related data to a single processor. A compiler could be made to recognize that source code includes locks that could be removed if the executable code dedicates all processing of related data to the same processor. Such a lock can be deemed extraneous and removed and/or ignored by the compiler when generating the executable code.

Some applications in multiprocessor environments may make significant use of locks to prevent simultaneous access to data. For example, in networking environments packets can be classified as belonging to a particular flow, which is a group of related packets that usually processes the packets in order, and usually accesses the same flow-specific state for use in processing. For flow-related data structures, if all packets of a given flow were processed by the same processor, the cache of each processor could be primed with each flow's specific data/state. In another example, in intensive number-crunching routines, operations often build upon previously performed computations and/or previously obtained values. Similar observations could be made for matrix calculations, graphics processing (e.g., moving texture, lighting source, etc.), or other applications. If all related computation were similarly directed to the same processor, the cache of each processor could be primed with the data for additional computations.

Software for networking applications is typically written assuming that flow pinning, or caching all data for an associated flow in only one processor's cache, is not occurring. Because flow pinning is assumed to not occur, locks are written into the source code to protect data structure access for both per-flow and not per-flow data. However, inter-processor per-flow locks are unnecessary with flow pinning because each processor exclusively owns the per-flow data associated with its pinned flows. Exclusive ownership refers to a state of cache lines for the per-flow data according to the MESI, or a similar, cache coherency protocol. With a compiler mechanism to recognize and remove unnecessary locks, a software developer could write code that would support locks to make the code portable to non flow-pinning systems, but have the compiler eliminate extraneous overhead. In one embodiment multithreading processors are used in the multiprocessor environment. With multithreading processors, inter-processor per-flow locks may be replaced with intra-processor locks, rather than completely eliminated. Intra-processor locks, or inter-thread locks, can be implemented much more efficiently than inter-processor locks, and thus provide overhead reduction as compared to leaving the inter-processor locks in the code. Inter-thread locks refer to locking data for a particular thread and preventing modification by a parallel thread executing on the same processor.

As used herein, a compiler is referenced generically and will be understood as including operations of a compiler and/or a pre-processor on source code, as described herein, except for functions (e.g., generating binary code) that are performed by a compiler and not a pre-processor. Likewise, the expression language extension is used generically herein to refer to any mechanism (e.g., pre-processor directive, pragma, programming language extension, etc.) with which one or more lines of source code can be marked for particular pre-processing/compiling. In one embodiment a compiler and/or pre-processor recognizes a programming language or development environment extension or pragma to allow an application programmer to specify data structures that are related or flow-specific, or result in multiple instances of related data. The compiler includes a load instruction to recognize the extension placed in the source code by the programmer, which indicates the load has implicitly exclusive access to the requested address. Such a load instruction may be referred to as an "exclusive load." In one embodiment the language extension includes an annotation placed on an array of data structures. The compiler assumes that each entry in the array corresponds to data associated with a different flow. When the compiler generates load operations related to an element of the array, the compiler uses the modified exclusive load instruction, indicating to the hardware that no cache coherency traffic is required for the load. Additionally, the exclusive load instruction can indicate that no snooping is required on the resulting cache line until the line is evicted by the processor itself.

In one embodiment the compiler additionally searches the source code to locate lock data structures within any per-flow data structures that are marked with the extension. The compiler can sequentially scan the code for data accesses related to each lock located. Locks for accessing the data are either automatically removed, in the case that the processor is single threaded, or automatically replaced with an intra-processor lock (inter-thread locks), in the case that the processor is multi-threaded. This replacement may be a replacement in only the generated binary or executable code, and not necessarily a modification of the source code, although a modified source code file or intermediate language source file could be generated.

With the language extension and compiler search and replace feature, a programmer can maintain portable code while still benefiting from the efficiencies of a flow-pinning multiprocessor environment. In the situation where the compiler and/or system do not support flow pinning, the code retains correctness via the programmer-provided locks. In the situation where the compiler and system do support flow pinning, unnecessary overhead due to implementation of locks can be automatically reduced while maintaining correctness of the application.

Figure 1:
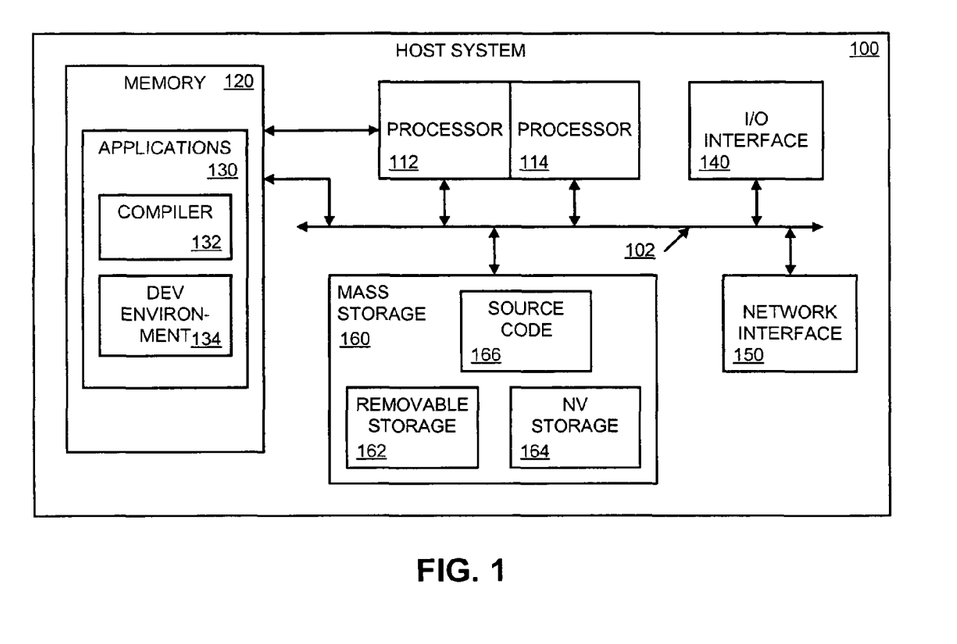
FIG. 1 is a block diagram of an embodiment of a host system with multiple processors and a compiler to operate on source code.

FIG. 1 is a block diagram of an embodiment of a host system with multiple processors and a compiler to operate on source code. Host system 100 represents any number of computer systems or electronic devices. For example, host system 100 may be a desktop computer, server, laptop computer, terminal, etc. Host system 100 includes bus system 102, which is an abstraction to represent interconnection lines, paths, and/or associated components. Bus system 102 may include point-to-point and/or multi-drop connectivity between components of host system 100.

Host system 100 includes one or more processors, depicted in FIG. 1 by processors 112 and 114. Processors 112 and 114 may be or include SMP, CMP, or other multiprocessor arrangements. Each processor 112 and 114 may include a separate cache (not shown) to store data temporarily for rapid access (as compared to access to memory 120 and/or mass storage 160). The rate of cache hits affects the performance of the processors, and cache hits may be improved with techniques to store related data in the same cache for execution by a single processor.

Memory 120 represents the main memory of host system 100 to provide temporary storage for code to be executed by processors 112 and/or 114. Memory 120 may include read-only memory (ROM), flash memory, one or more varieties of random access memory (RAM), or the like, or a combination of such devices or technologies. Memory 120 is an abstraction that may represent multiple components, as opposed to a single device. In one embodiment host system 100 includes applications 130, which may include software development applications, for example, but not limited to, compiler 132 and development environment 134. Development environment 134 represents the program with which a programmer develops source code, which is well understood by those skilled in the art. Compiler 132 in general receives source code, such as source code developed with development environment 134, and compiles the code into binary or executable form.

In one embodiment development environment 134 and compiler 132 are not located within the same host system. Additionally, neither development environment 134 nor compiler 132 is necessarily located on a host system that will execute the resulting program, although they may be. The representation of FIG. 1 is intended only for purposes of illustration to depict the various components of host systems that may be involved in the development, compiling, and ultimate execution of software.

In one embodiment source code written in development environment 134 includes one or more annotations to indicate related data structures to compiler 132. Compiler 132 may generate code differently based on one or more of the annotations than it would generate on identical code that did not have the annotations. The annotations can result in compiler 132 searching the source code and selectively removing sections of the code dealing with locks. Removing in this instance may refer to simply ignoring when generating lower-level code from the source code, rather than actually removing one or more lines of code from the source code. Thus, the actual source code may remain unaffected, while an executable generated from the source code does not include locks found written in the source code.

Host system 100 also includes I/O interface 140, which represents one or more mechanisms, circuits, modules, components, etc., that interface with an entity external to host system 100. The external entity may be another electronic device or a human. I/O interface 140 may include, but is not limited to, data ports, connectivity ports, monitor, pointing device/cursor control, keyboard wireless interface, etc. Network interface 150 enables host system 100 to interface with an external network, such as a local area network (LAN), the Internet, or other network. Network interface 150 may include one or more wireless components.

Host system 100 includes mass storage 160, which represents one or more non-volatile storage components. Mass storage 160 may include one or more of a disk drive (magnetic and/or optical, including a hard drive and/or compact disc (CD) or digital video/versatile drive (DVD) random access memory (ROM) drive), a flash storage device, or other non-volatile storage unit. Thus, mass storage 160 may include a machine-accessible medium such as removable storage 162 (e.g., DVD, flash) and/or other non-volatile storage (e.g., hard drive). Mass storage 160 may also include source code 166 for compilation by compiler 132. In an alternate embodiment a source code may be accessed by compiler 132 via I/O interface 140 and/or network interface 150.

Figure 2:
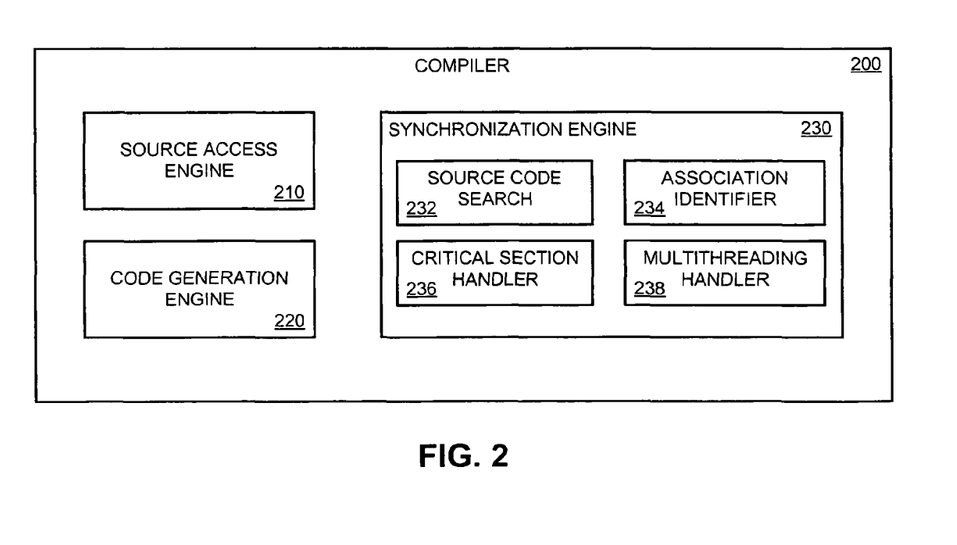
FIG. 2 is a block diagram of an embodiment of a compiler having a synchronization engine.

FIG. 2 is a block diagram of an embodiment of a compiler having a synchronization engine. Compiler 200 represents one possible example of a compiler according to compiler 132 of FIG. 1. Compiler 200 includes source access engine 210 and code generation engine 220. Source access engine 210 represents one or more mechanisms, including subroutines, functions, etc., to enable compiler 200 to access a source file. Source files may include makefile, code, library files, definition files, or any other file that may be used in generating a software program. The functioning of source access engine 210 is understood by those skilled in the art, and will not be discussed in detail herein. Through source access engine 210, compiler 200 may obtain source code that has special directives and/or other annotations, as discussed above.

Code generation engine 220 is also understood in the art, and will not be discussed in detail herein. Code generation engine 220 includes one or more mechanisms for translating the accessed source file(s) from a higher-level language (e.g., a programming language) into executable code. Code generation engine 220 may include a search function to search through the source for one or more patterns of code that can affect how the code is to be compiled. In one embodiment code generation engine 220 searches through source files first to determine if there are compiler-specific annotations, also referred to as pragmas. With the pragmas, compiler 200 may build a base from which to compile the remaining code.

In one embodiment compiler 230 include synchronization engine 230, or a comparable mechanism for modifying compilation of code for a multiprocessor system. Synchronization engine 230 includes multiple features or functions, which may include source code search 232, association identifier 234, critical section handler 236, and multithreading handler 238. One or more of the features may work in conjunction with features of either source access engine 210 or code generation engine 220, or both. In one embodiment synchronization engine 230 includes features independent of source access engine 210 or code generation engine 220, and in an alternate embodiment the core of one or more functions of one or more features is provided by source access engine 210 or code generation engine 220, and used in a modified way with synchronization engine 230. For example, code generation engine 220 may include a search function to step through source code to look for defined patterns. Synchronization 230 may include source code search feature 232 that provides the search function with a defined pattern as a parameter for which to search the source code. Providing parameters may include making a function call, as is well understood in the art.

Source code search 232 enables synchronization engine 230 to find annotations directed to identifying particular data structures, for example, per-flow data structures. Association identifier 234 enables synchronization engine 230 to determine that the data structures found through searching include related data, for example, per-flow data. Association identifier 234 could indicate that related data should be pinned to a particular processor. Additionally, association identifier 234 represents a feature to enable synchronization engine 230 to determine if locks are associated with the identified related data. In one embodiment this includes an extension of source code search feature 232 that searches for instances of locks.

Critical section handler 236 enables synchronization engine 230 to modify unnecessary locks located in the source code. A lock may be determined to be unnecessary if related data is marked with a compiler annotation to identify the related data to allow it to be pinned to a particular processor. Pinning the data to the processor and providing instructions that identify the data in an associated cache line as exclusive to the processor allows compiler 200 through critical section handler 236 to eliminate locks associated with the data. Even without a lock, there should be no cache coherency problem because the data is exclusively accessed by one processor.

In one embodiment a processor of the multiprocessor environment includes multithreading. In such an implementation, a lock may not be able to be simply removed. For example, one of the threads of the processor may be processing the data protected in the source code by the lock, and another of the threads could attempt to modify the data. Thus, multithreading handler 238 enables synchronization engine 230 to replace the inter-processor lock with an inter-thread lock, which does not require as much overhead as an inter-processor lock. For example, inter-processor communication is not necessary to execute inter-thread locking.

Figure 3:
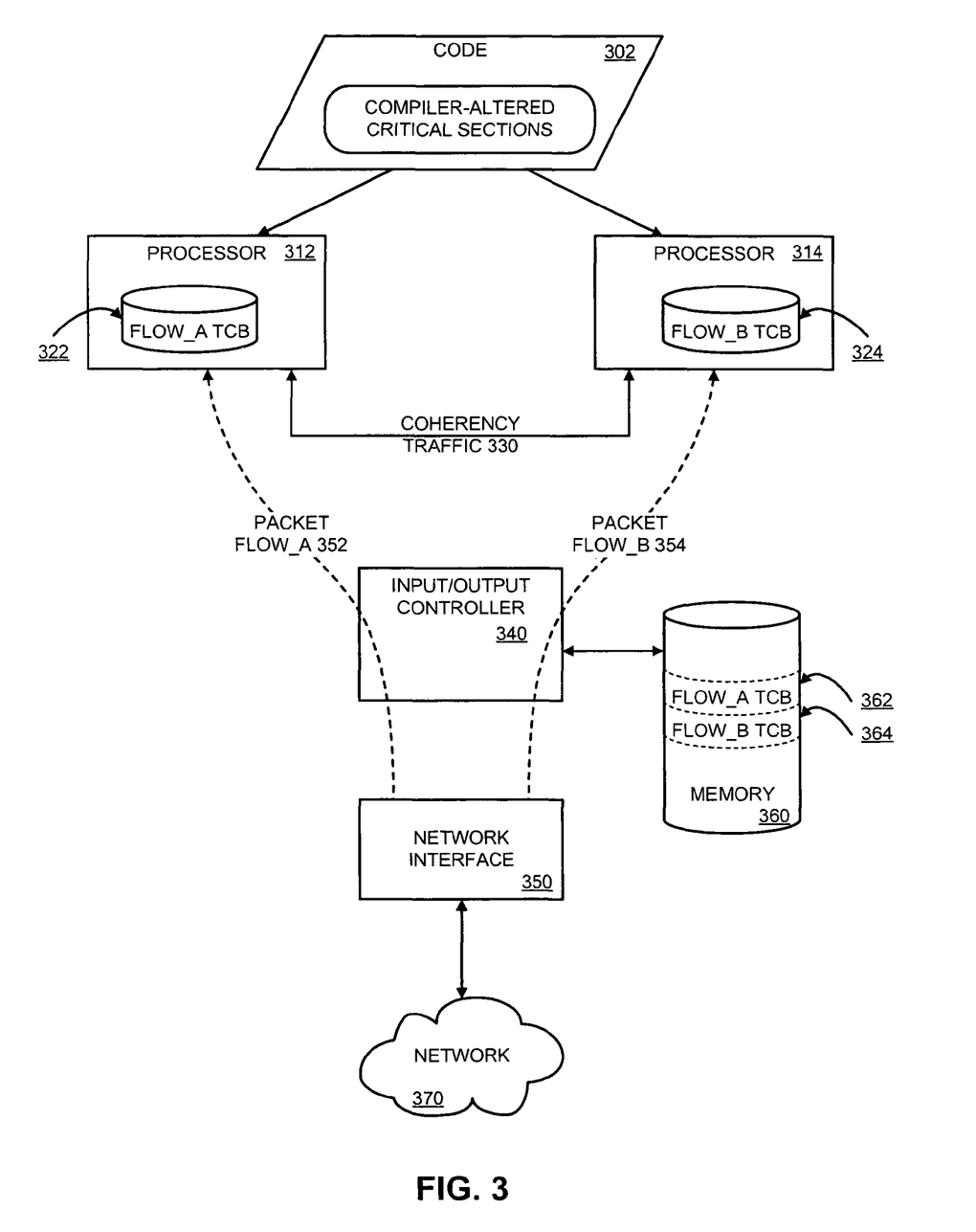
FIG. 3 is a block diagram of an embodiment of a multiprocessor system executing code with compiler-altered critical sections.

FIG. 3 is a block diagram of an embodiment of a multiprocessor system executing code with compiler-altered critical sections. FIG. 3 shows one potential flow of data according to a program developed with a compiler as described above. Code 302 is a program generated with a compiler from annotated application source code, which indicates per-flow data structures. The compiler can use these annotations to identify data structures for pinning, and the programmer may not do anything else or change the source code to assume flow pinning is occurring. If flow pinning does not occur such a code annotation would be ignored by the compiler. However, if the system supports flow pinning, the compiler searches for any locks within a per-flow data structure and removes accesses to these locks in resulting code 302. Code 302 contains no per-flow locks, or contains intra-processor locks in place of per-flow locks. Note that the compiler need not know which flows are pinned to what processors, only that flow pinning is done in a strict manner (i.e., packets within the same flow always are processed by the same processor).

When packets arrive from network 370, the packets can be classified into flows. For any flow-related data structures, if all packets of a given flow are processed by the same processor in the multiprocessor system, the cache of each processor will be primed with each flow's data. For example, the packets may be received from network 370 at network interface 350 and passed to input/output (I/O) controller 340. I/O controller 340 accesses memory 360 to access a TCP (transmit control protocol) control block, or TCB, used to maintain TCP reassembly state of a flow. For example, flow_A TCB 362 and flow_B TCB 364 of packet flow_A 352 pinned to processor 312 and packet flow_B 354 pinned to processor 314, respectively. The respective processors may include a copy of the corresponding TCB in their individual caches, as shown by flow_A TCB 322 and flow_B TCB 324. The TCB includes a flow-specific data structure. Traditional caching mechanisms can take advantage of flow locality by pinning flows to specific processors, however, some cache coherency traffic 330 is still unnecessarily present on the processor-to-processor interconnect.

Processor 312, for example, could be informed that when it loads a cache miss for flow_A TCB 352 of packet flow_A 352, processors 312 could abstain from broadcasting a request for exclusive access for flow_A TCB 362. Processor 312 could simply load the cache line from memory 360. Thus, both processors 312 and 314 could both be informed that the cache lines occupied by flow_A TCB 322 and flow_B TCB 324, respectively, are exclusively locked into their respective processors, eliminating the need for coherency traffic 330. Additionally, both processors 312 and 314 could be programmed to avoid snooping with respect to accesses to memory 360 for flow-specific data. In one embodiment a processor takes and assumes ownership of a cache line until indicated otherwise by the program. Cache lines within the processes can also be marked to prevent eviction of a cache line.

Although a specific networking example is discussed, the principles apply equally well to number-crunching (e.g., matrix calculations) applications, gaming applications (e.g., rendering lighting sources, moving textures, etc.), and other applications where related data could be directed to a single processing unit/core of a multiprocessor, cache coherent system.

Figure 4:
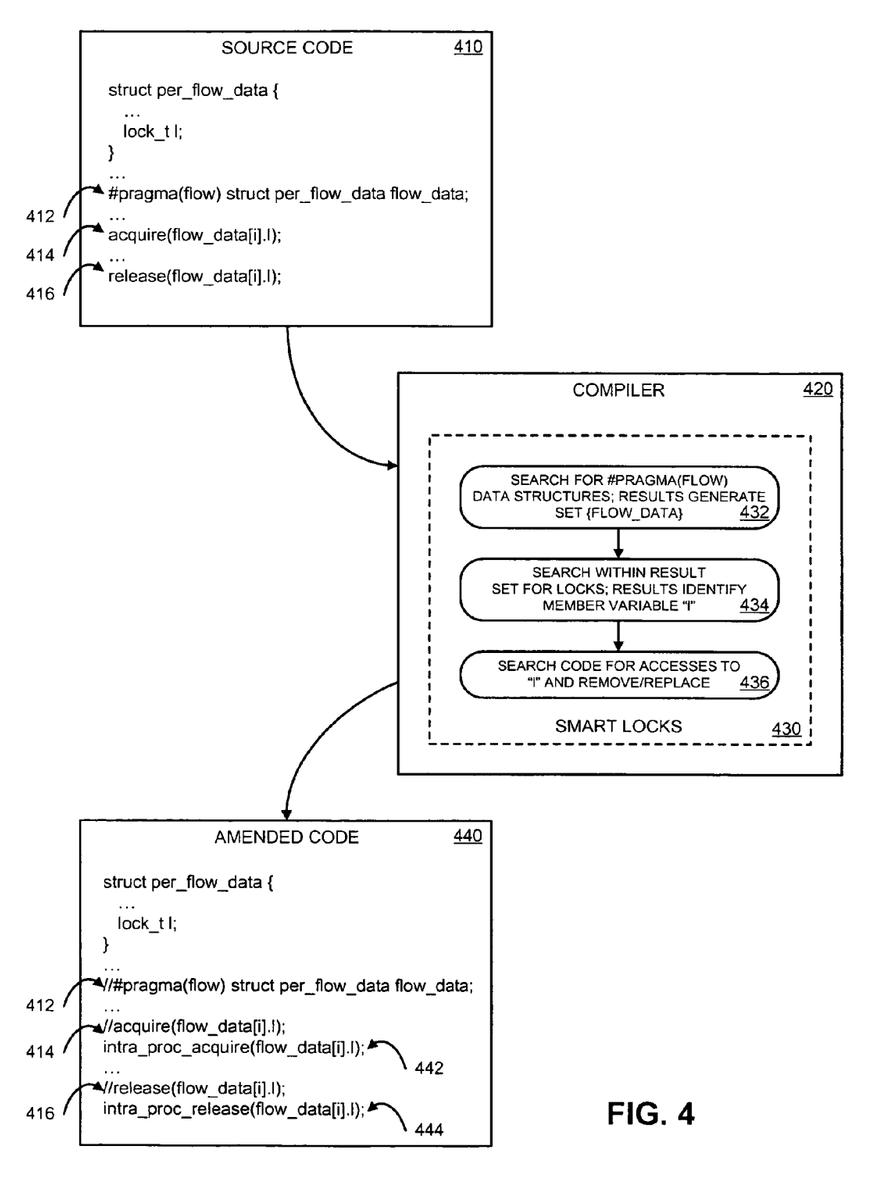
FIG. 4 is a block diagram of an embodiment of a compiler operating on source code.

FIG. 4 is a block diagram of an embodiment of a compiler operating on source code. Compiler 420 can be an implementation of a compiler as previously discussed herein. Specifically, compiler 420 depicts an example of compiling network software that has per-flow compiler directives in the source code. Compiler 420 includes smart locks 430, which represents one or more processes to be executed by compiler 420 to determine when locks in source code should and should not be removed. Colloquially, smart locks 430 may be said to optimize the locks in source code.

Consider source code 410, which includes an example of a per-flow data structure type, per_flow_data, having a lock "l" associated with it. Source code 410 includes statement 412, which defines structure flow_data as structure type per_flow_data, and provides a compiler preprocessor directive to indicate that flow_data is a flow. By indicating the flow to compiler 420, the compiler can pin data associated with flow_data to a single processor, and eliminate locks created to protect the flow data. For example, statements 414 and 416 include, respectively, a lock acquisition and a lock release for structure flow_data, of variable 1.

When source code 410 is compiled, smart locks 430 enables compiler 420 to search for #pragma(flow) data structures in the source code, and generate a results set of data structures found, 432. In this case, the results set includes {flow_data}. Smart locks 430 further enables compiler 420 to search within the result set of data structures found for locks, 434. In this case the results identify member variable "l", 434. Smart locks 430 then searches source code 410 for accesses to member variable "l" (and/or other results of the search for locks), and removes or replaces the locks, as appropriate. In FIG. 4 a multithreading multiprocessor environment is assumed, and so lock replacement is depicted. In an implementation that does not include multithreading, the locks could simply be removed.

Compiler 420 "generates" amended code 440, which may mean that the version of the source code from which a binary will be developed may be represented as in amended code 440. In practice, a source code file according to amended code 440 may not actually be created. For example, compiler 420 could provide amended code 440 in system memory to be used in execution. Amended code 440 has statements 412-416 of original source code 410 commented out; the statements that are commented out will not be present in the resulting binary. In one embodiment compiler 420 has generated statements 442 and 444 and/or intermediate code that could be represented by statements 442 and 444. Statements 442 and 444 replace inter-processor locks represented by the acquire( ) and release( ) functions by intra-processor functions intra_proc_acquire( ) and intra_proc_release( ), respectively, to handle multithreading in the processor.

Figure 5:
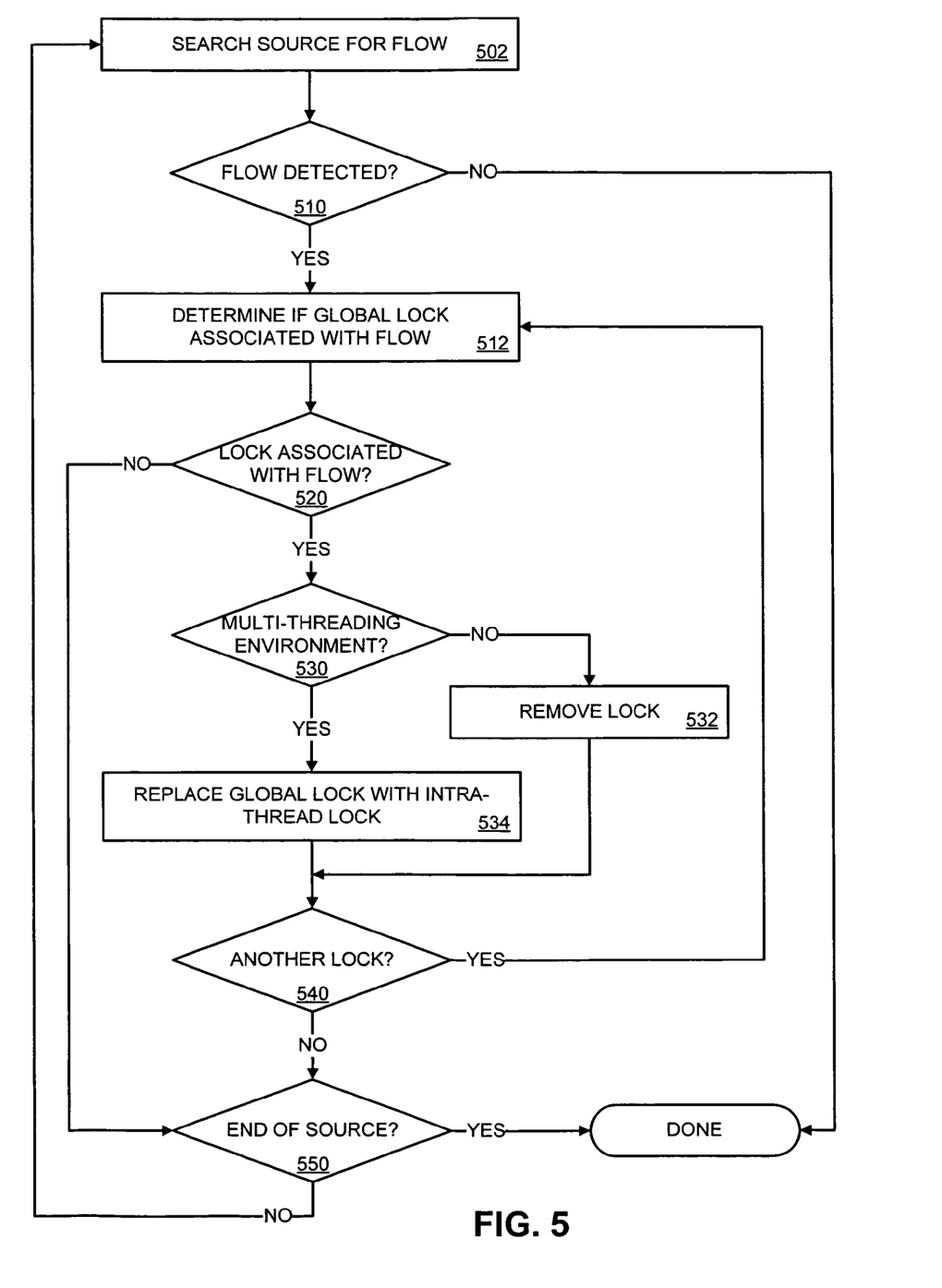
FIG. 5 is a flow diagram of an embodiment of a process for amending locks in source code.

FIG. 5 is a flow diagram of an embodiment of a process for amending critical sections in source code. A compiler searches source code to determine if flows are indicated, 502. The flows are streams of related data that can be pinned to a particular processor. If a flow is not detected, 510, the source code has no related data for which the compiler can amend locks, and the process ends. If a flow is detected, 510, the compiler determines if there is a global lock, meaning an inter-processor lock, associated with the flow, 512. If there is not a lock associated with the flow, 520, the compiler can determine whether the entirety of the source code has been searched, or whether there may be other flows.

If a lock is associated with the flow, 520, the compiler determines if the operating environment of the software includes multithreading processors, 530. In practice this determination may be determined earlier, but the determination presented here in this order merely for purposes of illustration. If there is multithreading, the global lock is replaced with an intra-processor, or inter-thread lock, 534. If there is no multithreading, the locks may be removed, 512. After removal or replacement of the lock, the compiler may search to determine if there are any other locks associated with the flow, 540. The source code may be searched for all locks until all locks have been removed or replaced. If there are no other locks, 540, the compiler determines if the end of the source code has been reached, and all flows found, 550. If the end of the source is reached, the process ends, otherwise, the compiler can search for other flows until all flows have been evaluated for unnecessary locks.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
    identifying data structures in source code that reference multiple instances of related data for an application in a multiprocessor, cache coherent system comprising multiple processors;
    searching the source code to identify a synchronization command referencing the related data; and
    compiling the source code to generate an executable program wherein the identified synchronization command for the related data is excluded when generating the executable program if the executable program dedicates all processing of the related data to a single one of the multiple processors in the system.

2. A method according to claim 1, wherein identifying the data structures comprises providing a language extension for a programming language used to develop the source code to indicate the related data.

3. A method according to claim 2, wherein identifying the data structures further comprises:
    searching the source code for the language extension; and
    indicating the language extension to a compiler to compile the source code.

4. A method according to claim 2, wherein providing the language extension comprises providing a pragma directive to indicate the related data.

5. A method according to claim 1, wherein the related data comprises data flows in a networking environment.

6. A method according to claim 1, wherein the related data comprises data associated with a matrix calculation.

7. A method according to claim 1, wherein searching the source code to identify the synchronization command comprises searching the source code to identify a critical section that locks the data for a particular processor of the multiple processors for a series of operations.

8. A method according to claim 1, wherein compiling the source code to generate the executable program that excludes the identified synchronization command further comprises excluding the synchronization command from an intermediate representation of the code in compiling the source code to the executable.

9. A method according to claim 8, wherein compiling the source code to generate the executable program that excludes the identified synchronization command further comprises replacing an inter-processor synchronization command with an intra-processor synchronization command for an implementation in a multi-threading processor.

10. An article of manufacture comprising a machine-accessible medium having content to provide instructions to result in an electronic device performing operations including:
    identifying a data structure in source code indicated by a pragma directive, the data structure to represent separate a data flow for a multiprocessor, cache coherent system comprising multiple processors;
    locating a critical section in the source code related to the identified data flow; and
    compiling the source code to remove the located critical section and generate binary code from the source code, the binary code excluding the removed critical section if the binary code dedicates all processing of the related data to a single one of the multiple processors in the system.

11. An article of manufacture according to claim 10, wherein compiling to remove the located critical section comprises removing an inter-processor lock on the data structure.

12. An article of manufacture according to claim 11, wherein compiling the source code to remove the located critical section further comprises replacing the inter-processor lock with an inter-thread synchronization to lock the data structure for one of multiple threads in a multi-threading processor.

13. An article of manufacture according to claim 10, wherein the multiprocessor, cache coherent system supports receive-side scaling.

14. A system comprising:
    an article of manufacture comprising a machine-accessible medium having content to provide instructions to result in an electronic device performing operations including pre-processing source code to mark a data structure in source code indicated by a pre-processing directive to identify related data for a multiprocessor, cache coherent system comprising multiple processors, and to locate a lock in the source code that references the related data, and compiling the source code to generate an executable program that lacks the lock, wherein the lock is excluded when generating the executable program if the executable program dedicates all processing of the related data to a single one of the multiple processors in the system;
    an interface to receive the article of manufacture and access the content on the machine-accessible medium; and
    a dynamic random access memory (DRAM) coupled to the interface to receive the accessed content from the interface and store the instructions for performing the operations.

15. A system according to claim 14, wherein pre-processing the source code to mark the data structure further comprises searching the source code to determine whether a pragma statement in the source code identifies a data structure.

16. A system according to claim 14 wherein to locate the lock in the source code that references the related data comprises to determine that the lock is unnecessary because the related data would be pinned to a single processor without the lock.

17. An apparatus comprising:
    a memory having data to define operations including identifying a data flow in source code marked by a programming language extension, the source code for an application for a multiprocessor, comprising multiple processors, searching the source code to identify a cache line lock for the data flow, and compiling the source code to generate an executable program that excludes the identified cache line lock, wherein the identified cache line lock is excluded when generating the executable program if the executable program dedicates all processing of the related data to a single one of the multiple processors in the system; and a processor coupled to the memory to execute the defined operations.

18. An apparatus according to claim 17, the multiprocessor, cache coherent system to support receive-side scaling.

19. An apparatus according to claim 17, wherein the programming language extension comprises a directive identifying the data flow to a compiler.

20. An apparatus according to claim 17, the memory further having data to identify an operation of refraining from passing cache coherency traffic for the cache line associated with the identified and excluded cache line lock.

* * * * *